United States Patent
Hiraiwa et al.

(10) Patent No.: US 6,260,540 B1
(45) Date of Patent: Jul. 17, 2001

(54) FUEL SUPPLY SYSTEM AND STATIC DISCHARGE DEVICE

(75) Inventors: Masaru Hiraiwa; Hisashi Kuwada, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/669,547

(22) Filed: Sep. 26, 2000

Related U.S. Application Data

(63) Continuation of application No. PCT/JP99/00312, filed on Jan. 26, 1999.

(51) Int. Cl.[7] .................................................. F02M 37/04
(52) U.S. Cl. ............................................. 123/497; 123/514
(58) Field of Search .................................. 123/497, 514, 123/509, 457, 495; 417/275, 313, 423.3; 73/863.25

(56) References Cited

U.S. PATENT DOCUMENTS

| | | | |
|---|---|---|---|
| 5,571,946 | * 11/1996 | Koshi et al. | 73/28.01 |
| 5,762,047 | 6/1998 | Yoshioka et al. | 123/509 |
| 5,785,032 | * 7/1998 | Yamashita et al. | 123/509 |
| 5,818,088 | * 10/1998 | Ellis | 257/355 |
| 5,900,148 | * 5/1999 | Izutani et al. | 210/416.4 |
| 5,903,220 | * 5/1999 | Jon et al. | 340/600 |
| 6,164,267 | * 12/2000 | Okada et al. | 123/510 |

FOREIGN PATENT DOCUMENTS

96/23967    8/1996   (WO).

* cited by examiner

*Primary Examiner*—Henry C. Yuen
*Assistant Examiner*—Mahmoud Gimie
(74) *Attorney, Agent, or Firm*—Sughrue, Mion, Zinn, Macpeak & Seas, PLLC

(57) ABSTRACT

A fuel supply system is provided with a static discharge circuit (30) placed on the surface of a cover (3) fitted in the opening (2a) of a fuel tank (2) and used to discharge the static electricity generated because of the intense friction between fuel and the filter element (5a) of a fuel filter (5) when the fuel passes through the filter element (5a). The static discharge circuit (30) is fitted with output terminals (38c) so arranged as to externally output an operation confirming signal for an operation confirming display lamp (37) by making use of a pulse signal at the time of charging-discharging. Therefore, the static electricity can surely be discharged and a decrease in the amount of fuel supply to and engine can also be recognized beforehand by detecting the fact that the filter element (5a) is clogged with foreign matter and/or the malfunctioning of a fuel pump (4) occurs.

11 Claims, 4 Drawing Sheets

FIG.4(a) OPERATION OF KEY SWITCH 41

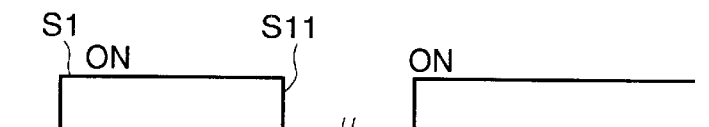

FIG.4(b) OPERATION OF POWER SUPPLY RELAY 43

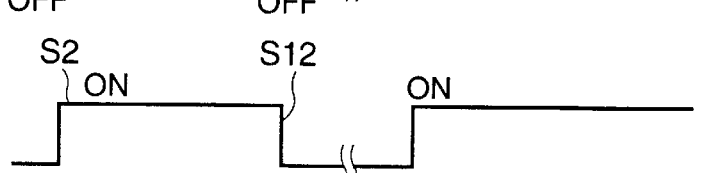

FIG.4(c) FLOW RATE OF FUEL FLOWING THROUGH FILTER ELEMENT 5b OF FUEL FILTER 5

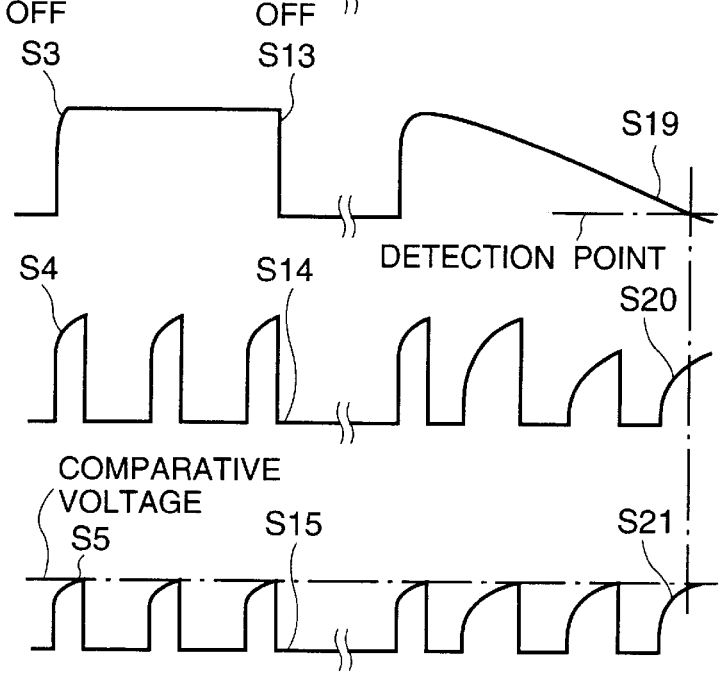

FIG.4(d) STATIC VOLTAGE GENERATED IN RELAY TERMINAL 19

FIG.4(e) INPUT VOLTAGE OF COMPARATOR 34

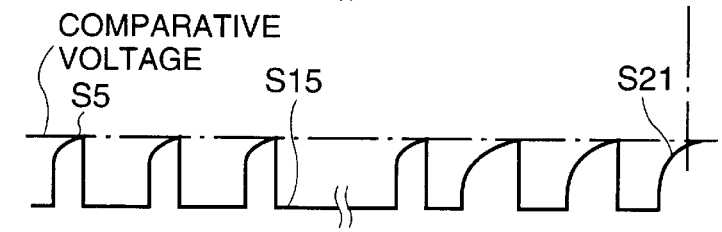

FIG.4(f) OUTPUT VOLTAGE OF COMPARATOR 34

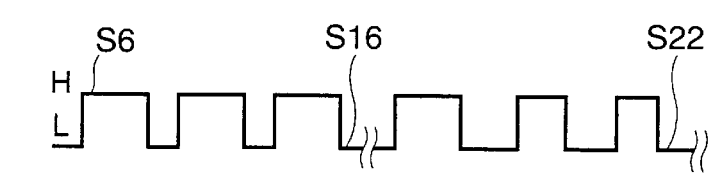

FIG.4(g) OUTPUT VOLTAGE OF WAVEFORM SHAPING CIRCUIT 35

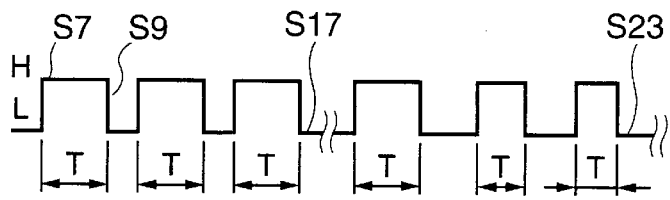

FIG.4(h) OPERATION OF SWITCHING ELEMENT 36 AND OPERATION CONFIRMING DISPLAY LAMP 37

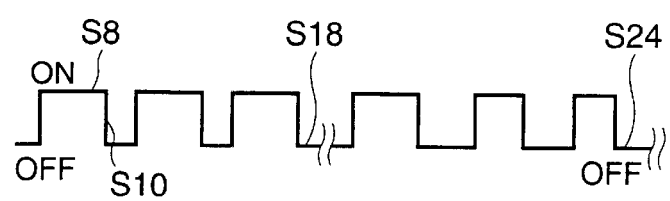

FUEL SUPPLY SYSTEM AND STATIC DISCHARGE DEVICE

This is a Continuation of PCT Application No. PCT/JP99/00312 filed Jan. 26, 1999, the disclosure of which is incorporated herein by reference.

BACKGROUND OF THE INVENTION

1. Field of the Invention

The present invention relates to a fuel supply system mounted in an automobile fuel tank and used for supplying fuel under pressure to an injector for emitting a jet of fuel to an automobile engine.

2. Description of the Related Art

FIGS. 5 and 6 show a conventional fuel supply system shown in International Publication No. WO96/23967: FIG. 5 is a side sectional view and FIG. 6 is a plan view.

In these drawings, reference numeral 1 denotes a fuel supply system, which comprises a cover 3, a fuel pump 4, a fuel filter 5, a pressure regulator 6, a fuel level gauge 7, an electric connector 8 and a discharge pipe 9, these being integrally formed and suspended down the open side 2a of a metal or plastic fuel tank 2.

The fuel filter 5 is formed with a holding member 5a made of conductive plastic material and a filter element 5b contained therein, these being liquid-tightly sealed by welding the cover 3 to a boundary portion 10. The holding member 5a holds the fuel pump 4 in its center, the pressure regulator 6 and the fuel level gage 7 in its lower end portion. A gasket 11 for keeping air-tightness is also held between the cover 3 and the fuel tank 2.

In the holding member 5a of the fuel filter 5, an inlet portion 12 as a fuel inlet for the fuel filter 5 is provided on the upper inner peripheral side of the holding member 5a and coupled to the discharge pipe 13 of the fuel pump 4. A pipe 14 (shown by a chain line) forming a first fuel outlet out of the two fuel outlets of the holding member 5a extends upward along the axial direction from the lower end of the holding member 5a. The pipe 14 communicates with the discharge pipe 9 provided to the cover 3 whereby to form a fuel passage for use in supplying filtered fuel. A return pipe 15 forming a second fuel outlet is provided in the lower side portion of the holding member 5a. A strainer 16 is used for filtering off foreign matter such as iron powder in the fuel tank 2 when the fuel in the fuel tank 2 is sucked into the fuel pump 4.

The electric connector 8 is formed integrally with the cover 3 by embedding a plurality of terminal pins 8a and 8b in the insulating plastic material of the cover 3 by direct insert molding. The terminal pins 8a and 8b of the electric connector 8 are connected to one side of a power supply relay (not shown) and a battery (not shown) outside the fuel tank 2. Moreover, the electric connector 8 is also used to supply power to the motor (not shown) of the fuel pump 4 via a lead wire 20 within the fuel tank 2.

Further, an electric signal derived from the fuel level gage 7 indicative of the liquid level is taken out of the fuel tank 2 similarly via a terminal pin (not shown) and a lead wire (not shown).

In the fuel supply system 1 thus arranged, the fuel in the fuel tank 2 is sucked through the strainer 16 when the fuel pump 4 is supplied with power via the electric connector 8 and the lead wire 20 and operated. Then the fuel flows in a passage 17 in the direction of an arrow A after being discharged from the discharge pipe 13 and passes through the filter element 5b before reaching a lower space 18 beneath the filter element 5b.

Further, part of the fuel is returned to the fuel tank 2 again by the pressure regulator 6 for the purpose of adjusting the fuel pressure, whereas the rest of fuel is caused to flow in the pipe 14 in the direction of an arrow B and supplied to the injector of a fuel injection system of an engine (not shown) via the discharge pipe 9.

As static electricity is generated because of intense friction between the fuel and the filter element 5b when the fuel passes therethrough during the process of feeding the fuel, the static electricity has been designed to be dissipated from a relay terminal 19 secured to the inner peripheral portion of the holding member 5a via the lead wire 20 toward the terminal 8b.

However, the prior art fuel supply system above may be used in the electrostatically charged condition because it is not possible to externally confirm the slip-off of the relay terminal 19 secured to the holding member 5a used to dissipate the static electricity or the disconnection of the lead wire 20.

When the fuel pump 4 is operated for hours, moreover, the filter element 5b may be clogged with powder deriving from the wearing of slide parts such as brushes in the fuel pump 4 and a commutator and/or the foreign matter passed through the strainer 16, for example, may be introduced into the fuel pump 4. As a result, the operation of the engine has become unstable because the fuel pump 4 is unable to sufficiently supply the fuel to the injector of the fuel injection system of the engine.

SUMMARY OF THE INVENTION

An object of the present invention intended to solve the foregoing problems is to provide a fuel supply system for making it possible to check whether or not static electricity is being discharged and a static discharge device.

Another object of the present invention is to provide a fuel supply system for making it possible to inform a decrease in the supply amount of fuel to an engine whenever a filter element is clogged with foreign matter or a fuel pump malfunctions.

A fuel supply system according to the invention comprises: a cover portion fitted in the opening of a fuel tank and equipped with a discharge pipe; a fuel pump for supplying fuel in the fuel tank under pressure to the injector of an engine via the discharge pipe; a fuel filter for filtering the fuel discharged from the fuel pump; a static discharge circuit fitted to the cover portion and electrically connected to a relay terminal electrically connected to the fuel filter and used for charging and discharging the static voltage generated in the fuel filter; and operation confirming display means whose operation is based on the charging and discharging of the static discharge circuit.

The static discharge circuit comprises: voltage comparator means for comparing the voltage of the supplied static electricity with a comparative voltage which is set with a minimum necessary flow rate of fuel flowing in the fuel filter as a reference; waveform shaping means for shaping a signal from the voltage comparator means; and a switching element for conducting the static electricity generated in the fuel filter to a grounding portion by a signal from the waveform shaping means.

Operation confirming signal output means and the operation confirming display means are operated by a signal from the waveform shaping means.

Further, a fuel supply system comprises: a cover portion fitted in the opening of a fuel tank and equipped with a discharge pipe; a fuel pump for supplying fuel in the fuel tank under pressure to the injector of an engine via the discharge pipe; a fuel filter for filtering the fuel discharged from the fuel pump; a static discharge circuit fitted to the cover portion and electrically connected to a relay terminal electrically connected to the fuel filter and used for charging and discharging the static voltage generated in the fuel filter; and operation confirming signal output means for outputting a signal based on the charging and discharging of the static discharge circuit.

A static discharge device according to the invention comprises: voltage comparator means for comparing the voltage of the supplied static electricity with a comparative voltage which is set with a minimum necessary flow rate of fuel flowing in the fuel filter as a reference; waveform shaping means for shaping a signal from the voltage comparator means; a switching element for conducting the static electricity generated in the fuel filter to a grounding portion; and operation confirming display means operated by a signal from the waveform shaping means.

Further, a static discharge device comprises: voltage comparator means for comparing the voltage of the supplied static electricity with a comparative voltage which is set with a minimum necessary flow rate of fuel flowing in the fuel filter as a reference; waveform shaping means for shaping a signal from the voltage comparator means; a switching element for conducting the static electricity generated in the fuel filter to a grounding portion; and operation confirming signal output means operated by a signal from the waveform shaping means.

BRIEF DESCRIPTION OF THE DRAWINGS

FIGS. 4A to 4H are time charts illustrating the operation of the fuel supply system as well as the static discharge circuit according to the embodiment of the invention.

DETAILED DESCRIPTION OF THE PREFERRED EMBODIMENTS

Now, a description will be given in more detail of preferred embodiments of the invention with reference to the accompanying drawings.

Figure 1:
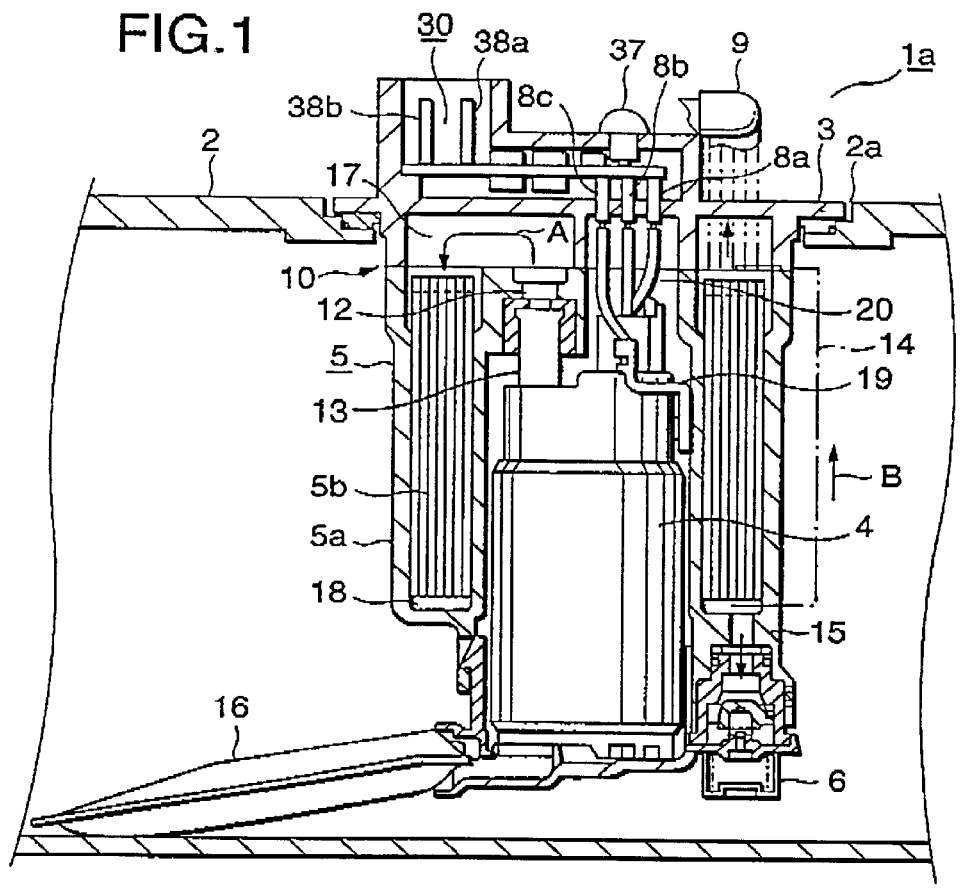
FIG. 1 is a side sectional view of a fuel supply system embodying the invention.
Figure 2:
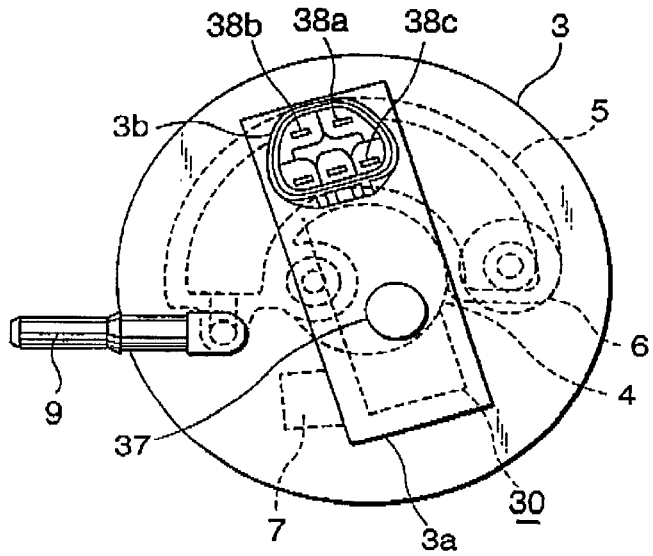
FIG. 2 is a plan view of the fuel supply system of FIG. 1.

FIG. 1 is a side sectional view of a fuel supply system embodying the invention. FIG. 2 is a plan view of the fuel supply system of FIG. 1.

In these drawings, reference numeral 1a denotes a fuel supply system; 3, a cover; 4, a fuel pump; 5, a fuel filter; 6, a pressure regulator; 7, a fuel level gage; and 9, a discharge pipe, these being integrally formed and suspended down the open side 2a of a metal or plastic fuel tank 2. Further, a static discharge circuit 30 is contained in a case 3a formed integrally with the surface portion of the cover 3 as a place free from being eroded by the fuel in the fuel tank 2.

The fuel filter 5 is formed with a holding member 5a made of conductive plastic material and a pressure regulator 6 contained therein, these being liquid-tightly sealed by welding the cover 3 to a boundary portion 10. The holding member 5a holds the fuel pump 4 in its center, the pressure regulator 6 and the fuel level gage 7 in its lower end portion. A gasket 11 for keeping air-tightness is also held between the cover 3 and the fuel tank 2.

In the holding member 5a of the fuel filter 5, an inlet portion 12 as a fuel inlet for the fuel filter 5 is provided on the upper inner peripheral side of the holding member 5a and coupled to the discharge pipe 13 of the fuel pump 4. A pipe 14 (shown by a chain line) forming a first fuel outlet out of the two fuel outlets of the holding member 5a extends upward along the axial direction from the lower end of the holding member 5a.

The pipe 14 communicates with the discharge pipe 9 provided to the cover 3 whereby to form a fuel passage for use in supplying filtered fuel. A return pipe 15 forming a second fuel outlet is provided in the lower side portion of the holding member 5a. A strainer 16 is used for filtering off iron powder and the like when the fuel in the fuel tank 2 is sucked into the fuel pump 4.

Figure 3:
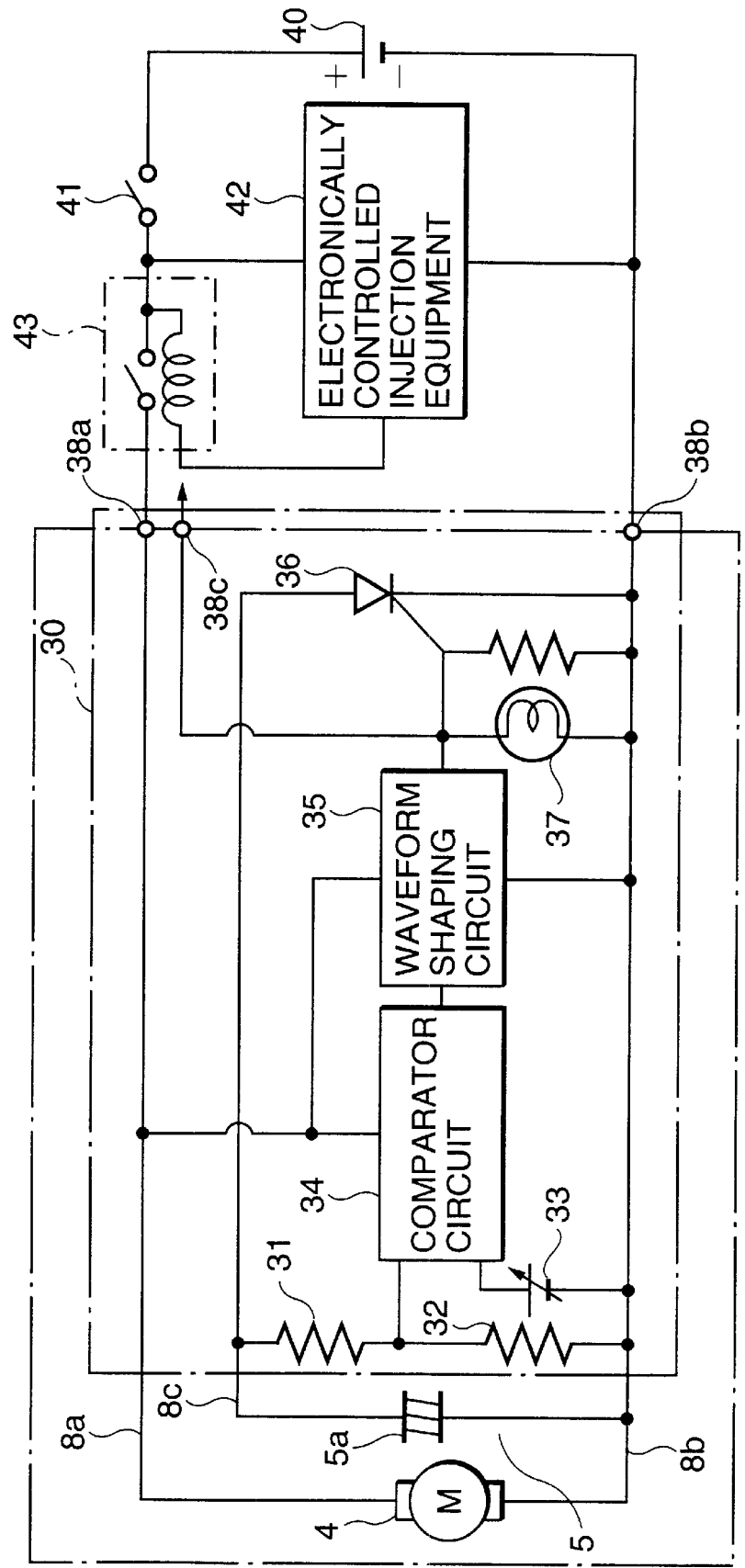
FIG. 3 is a connection diagram in the fuel supply system and a static discharge circuit, showing connection in a vehicle according to the embodiment of the invention.
Figure 5:
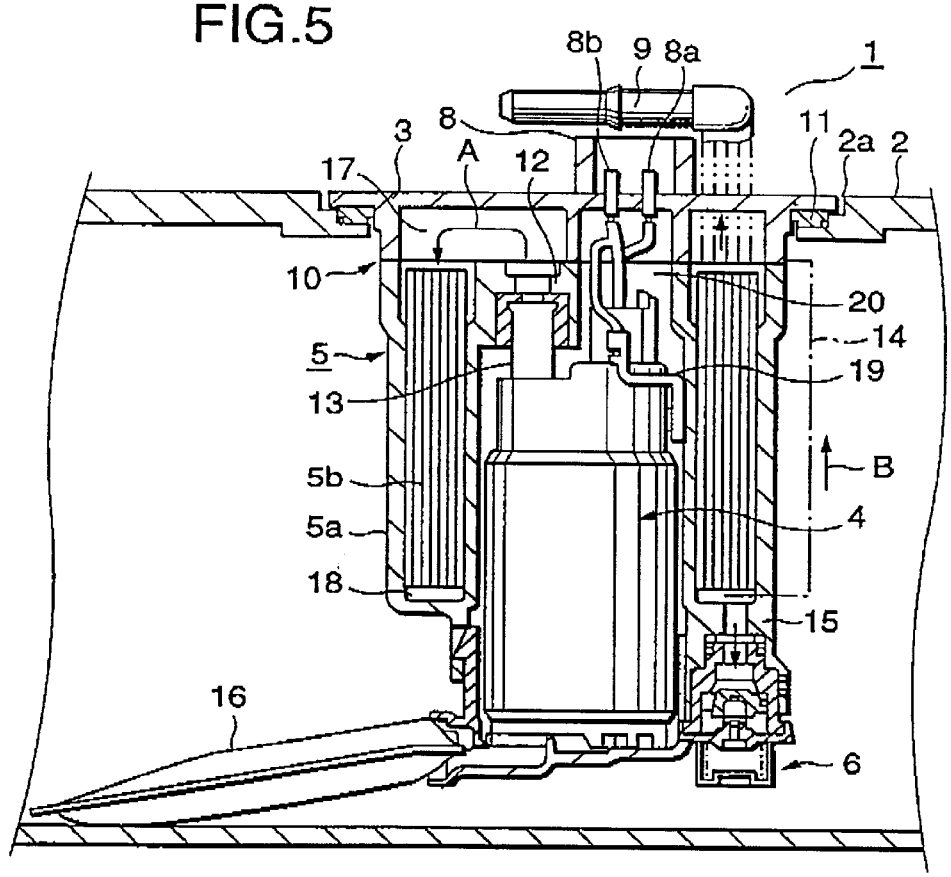
FIG. 5 is a side sectional view of a conventional fuel supply system.
Figure 6:
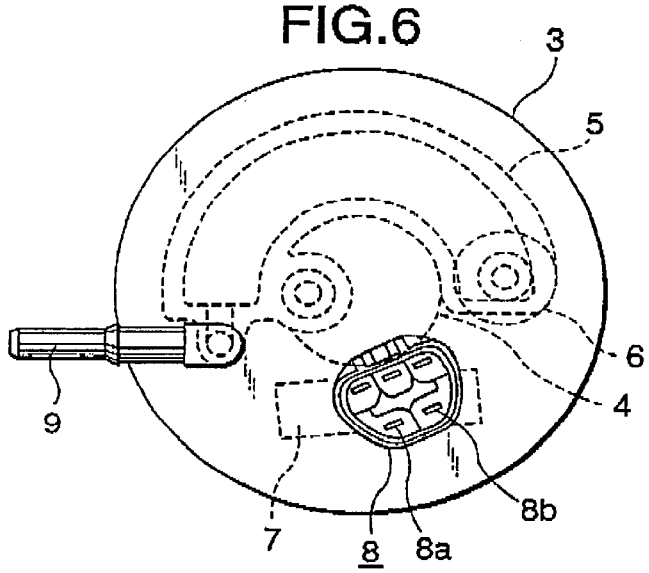
FIG. 6 is a plan view of the fuel supply system of FIG. 5.

Referring to FIG. 3, there is shown a connection diagram in the fuel supply system and the static discharge circuit, showing connection in a vehicle.

The static discharge circuit 30 contained in the case 3a includes: voltage dividing resistors 31 and 32 for dividing the static voltage generated in the holding member 5a; and a comparator 34 for comparing the voltage generated between the voltage dividing resistor 32 and the comparator 34 with the comparative voltage 33 set with a minimum fuel flow rate necessary for the injector of the fuel injection system mounted in an engine as a reference, the comparator 34 functioning as what outputs an H signal when the voltage generated therebetween becomes greater than the comparative voltage 33. The static discharge circuit 30 further includes: a waveform shaping circuit 35 having a timer function for converting the voltage signal from the comparator 34 to an electric signal having a constant pulse width (T: one second, for example); a switching element 36 for performing a switching operation according to the signal from the waveform shaping circuit 35 so as to conduct; an operation confirming display lamp 37 that is lighted at the same timing as the timing at which the switching element 36 conducts; a (+)power supply terminal 38a and a (−)power supply terminal 38b for supplying voltage to the fuel pump 4, the comparator 34 and the waveform shaping circuit 35; and signal output terminals 38c for externally outputting the same operation confirming signal as the voltage signal for actuating the operation confirming display lamp 37.

The (+)power supply terminal 38a is connected to a power supply relay 43 to be controlled by electronically controlled injection equipment 42 via a key switch 41 from the (+)terminal of the battery 40, whereas the (−)power supply terminal 38b is connected to the (−)terminal of the battery 40.

A lead wire 20 for supplying power to the fuel pump 4 is connected via terminals 8a and 8b to the static discharge circuit 30. An electric signal connected to the fuel level gage 7 and used to indicate the liquid level is similarly connected via a lead wire (not shown) to the static discharge circuit 30. Further, the lead wire 20 from a relay terminal 19 secured to the inner peripheral portion of the holding member 5a is also connected via a terminal 8c to the static discharge circuit 30.

Incidentally, the relay terminal 19 may be directly and electrically connected to the filter element 5b, whereby the arrangement can be made less expensive because it is unnecessary to use conductive plastics for the holding member 5a in this case.

FIGS. 4A to 4H are time charts illustrating the operation of the fuel supply system as well as the static discharge circuit in which FIG. 4A is a constitutional diagram illustrating the operation of the key switch 41; FIG. 4B a constitutional diagram illustrating the operation of the power supply relay 43; FIG. 4C is a flow rate of fuel flowing through the filter element 5b of the fuel filter 5 due to the actuation of the fuel pump 4; FIG. 4D is the static voltage generated in the relay terminal 19 secured to the inner peripheral portion of the holding member 5a as fuel passes through the filter element 5b of the fuel filter 5; FIG. 4E is the voltage fed into the comparator 34 after the static voltage generated in FIG. 4D is divided up within the voltage dividing resistors 31 and 32; FIG. 4F is the voltage outputted from the comparator 34 having the function of outputting the H signal when the voltage between the voltage dividing resistor 32 and the comparator 34 becomes greater than the comparative voltage 33 after the voltage inputted in FIG. 4F is compared with the comparative voltage; FIG. 4G is the output voltage of the waveform shaping circuit 35 having the function of converting the voltage signal from the comparator 34 to the voltage signal having a constant pulse width; and FIG. 4H is the operating condition of the switching element 36 and the operation confirming display lamp 37.

Referring now to FIGS. 1 to 4H, the fuel supply system thus configured operates as described below.

When the key switch 41 is turned on (S1), voltage is applied from the battery 40 to the electronically controlled injection equipment 42. Then the power supply relay 43 controlled by the electronically controlled injection equipment 42 is actuated (S2), so that power is supplied to the fuel pump 4 via the (+)power supply terminal 38a, the static discharge circuit 30 and the terminal 8a.

When the fuel pump 4 is driven, the fuel in the fuel tank 2 is sucked through the strainer 16 before being discharged from the discharge pipe 13. Then the fuel flows in the passage 17 in direction of arrow A, passes through the filter element 5b and reaches the lower space 18 beneath the filter element 5b.

Further, part of the fuel is returned to the fuel tank 2 again by the pressure regulator 6 for the purpose of adjusting the fuel pressure, whereas the rest of fuel is caused to flow in the pipe 14 in direction of arrow B and supplied to the injector of the fuel injection system of an engine (not shown) via the discharge pipe 9.

When the fuel passes through the filter element 5b of the fuel filter 5 during the process of feeding the fuel (S3), static electricity is generated (S4) because of intense friction between the fuel and the filter element 5b. The voltage of the static electricity thus generated then is equivalent to a value proportionate to the flow rate of the fuel flowing through the filter element 5b. The voltage is applied to the static discharge circuit 30 from the relay terminal 19 secured to the inner peripheral portion of the holding member 5a via the lead wire 20 and the terminal 8c and divided by the voltage dividing resistors 31 and 32.

When the voltage across both terminals of the voltage dividing resistor 32, that is, the voltage applied to the comparator 34, becomes higher than the comparative voltage 34 (S5), the output voltage of the comparator 34 is turned to H voltage (S6) and the voltage signal having a constant pulse width (T: one second, for example) is outputted from the waveform shaping circuit 35 (S7).

Consequently, the switching element 36 and the operation confirming display lamp 37 are turned on (S8).

When the pulse width (T) outputted from the waveform shaping circuit 35 is terminated (S9), the switching element 36 and the operation confirming display lamp 37 are turned off (S10). While the fuel is flowing through the filter element 5b of the fuel filter 5 then, S3–S10 above are repeatedly followed and the operation confirming display lamp 37 is kept flashing. Simultaneously, the operation confirming signal is outputted outside from the signal output terminals 38c.

When the key switch 41 is turned off (S11), the voltage supplied from the battery 40 via the electronically controlled injection equipment 42, the power supply relay 43, the (+)power supply terminal 38a, the static discharge circuit 30 and the terminal 8a is cut off (S12), whereupon the fuel pump 4 stops operation, whereby the flow rate of the fuel flowing through the filter element 5b of the fuel filter 5 is turned to 0 (S13).

As a result, the static voltage of the relay terminal 19, the input-output voltage of the comparator 34 and the output voltage of the waveform shaping circuit 35 all come to 0 (S14–S17), so that the flashing of the operation confirming display lamp 37 is suspended (S18).

When the fuel pump 4 is actuated by turning on the key switch 41 again, the steps (S1–S10) are similarly to be repeated. However, the operation of the fuel pump 4 for hours causes the filter element 5b to be clogged with powder deriving from the wearing of slide parts such as brushes in the fuel pump 4 and a commutator and/or causes foreign matter to be introduced into the fuel pump 4, which results in lowering the flow rate of the fuel flowing in the filter element 5b of the fuel filter 5 up to a detection point as a minimum value necessary for the injector of the fuel supply system mounted in the engine (S19). Then the static voltage generated when the fuel passes through the filter element 5b drops (S20) and the voltage across both the terminals of the voltage dividing resistor 32, that is the voltage applied to the comparator 34 becomes lower than the comparative voltage 33 (S21). Accordingly, the H voltage is not outputted from the comparator 34 (S22) nor is the pulse voltage signal from the waveform shaping circuit 35 (S23).

Consequently, the switching element 36 and the operation confirming display lamp 37 are also turned off (S24), so that the operation confirming signal is not outputted outside from the signal output terminals 38c.

The detection point where the unusual lowering of the flow rate of fuel being discharged is detected may be set optionally by varying the comparative voltage 33. However, it is preferable to set the detection point slightly higher than the minimum flow rate needed for the injector of the fuel supply system mounted in the engine.

In the fuel supply system thus arranged, whether or not the static electricity of the fuel filter is discharging can be checked by confirming the flashing of the operation confirming display lamp without removing the fuel supply system from the fuel tank. Moreover, any abnormal operating condition can be recognized beforehand as the amount of fuel supply to the engine decreases by detecting the fact that the filter element is clogged with powder deriving from the wearing of slide parts such as brushes in the fuel pump and a commutator and/or foreign matter is introduced into the fuel pump.

An easy-to-confirm flashing period can be set to the operation confirming display lamp by adjusting the timing of the timer of the waveform shaping circuit.

Whether or not the static electricity of the fuel filter is discharging can easily be checked from a place separated from the fuel supply system by monitoring the signal from the operation confirming output terminal without directly checking the operation confirming display lamp fitted to the fuel supply system.

Moreover, forming a static discharge unit as the static discharge circuit separately from the fuel supply system makes possible the addition of such a static discharge unit to any conventional fuel supply system or mount it in an engine room or the inside of a car, thus achieving the same effect as what has been stated above.

The fuel supply system according to the invention is provided with the static discharge circuit placed on the surface of the cover fitted in the opening of the fuel tank and used to discharge the static electricity generated because of the intense friction between the fuel and the filter element of the fuel filter when the fuel passes through the filter element. The static discharge circuit is fitted with the output terminals so arranged as to externally output the operation confirming signal for the operation confirming display lamp by making use of the pulse signal at the time of charging-discharging. Therefore, the static electricity can surely be discharged and a decrease in the amount of fuel supply to the engine can also be recognized beforehand by detecting the fact that the filter element is clogged with foreign matter and/or the malfunctioning of the fuel pump occurs.

Moreover, it is possible to provide the static discharge device in the form of a unit having the function of surely discharging the static electricity and recognizing a decrease in the amount of fuel supply to the engine by detecting the fact that the filter element is clogged with foreign matter or the malfunctioning of the fuel pump occurs.

What is claimed is:

1. A fuel supply system comprising:
    a cover portion fitted in the opening of a fuel tank and equipped with a discharge pipe;
    a fuel pump for supplying fuel in said fuel tank under pressure to the injector of an engine via said discharge pipe; a fuel filter for filtering the fuel discharged from said fuel pump;
    a static discharge circuit fitted to said cover portion and electrically connected to a relay terminal electrically connected to said fuel filter and used for charging and discharging the static voltage generated in said fuel filter; and
    operation confirming display means whose operation is based on the charging and discharging of said static discharge circuit.

2. A fuel supply system as claimed in claim 1, wherein said static discharge circuit comprising: voltage comparator means for comparing the voltage of the supplied static electricity with a comparative voltage which is set with a minimum necessary flow rate of fuel flowing in said fuel filter as a reference; waveform shaping means for shaping a signal from said voltage comparator means; and a switching element for conducting the static electricity generated in said fuel filter to a grounding portion by a signal from said waveform shaping means.

3. A fuel supply system as claimed in claim 2, wherein said operation confirming display means is operated by a signal from said waveform shaping means.

4. A fuel supply system comprising: a cover portion fitted in the opening of a fuel tank and equipped with a discharge pipe;
    a fuel pump for supplying fuel in said fuel tank under pressure to the injector of an engine via said discharge pipe;
    a fuel filter for filtering the fuel discharged from said fuel pump;
    a static discharge circuit fitted to said cover portion and electrically connected to a relay terminal electrically connected to said fuel filter and used for charging and discharging the static voltage generated in said fuel filter; and
    operation confirming signal output means for outputting a signal based on the charging and discharging of said static discharge circuit.

5. A fuel supply system as claimed in claim 4, wherein said static discharge circuit comprises: voltage comparator means for comparing the voltage of the supplied static electricity with a comparative voltage which is set with a minimum necessary flow rate of fuel flowing in said fuel filter as a reference; waveform shaping means for shaping a signal from said voltage comparator means; and a switching element for conducting the static electricity generated in said fuel filter to a grounding portion by a signal from said waveform shaping means.

6. A fuel supply system as claimed in claim 5, wherein said operation confirming display means is operated by a signal from said waveform shaping means.

7. A fuel supply system as claimed in claim 4, further comprising operation confirming display means for outputting a signal based on the charging and discharging of said static discharge circuit.

8. A fuel supply system as claimed in claim 7, wherein said operation confirming signal output means and said operation confirming display means are operated by a signal from said waveform shaping means.

9. A static discharge device comprising:
    voltage comparator means for comparing the voltage of the supplied static electricity with a comparative voltage which is set with a minimum necessary flow rate of fuel flowing in said fuel filter as a reference;
    waveform shaping means for shaping a signal from said voltage comparator means; a switching element for conducting the static electricity generated in said fuel filter to a grounding portion; and
    operation confirming display means operated by a signal from said waveform shaping means.

10. A static discharge device comprising:
    voltage comparator means for comparing the voltage of the supplied static electricity with a comparative voltage which is set with a minimum necessary flow rate of fuel flowing in said fuel filter as a reference;
    waveform shaping means for shaping a signal from said voltage comparator means;
    a switching element for conducting the static electricity generated in said fuel filter to a grounding portion; and
    operation confirming signal output means operated by a signal from said waveform shaping means.

11. A static discharge device as claimed in claim 10, further comprising operation confirming display means operated by a signal from said waveform shaping means.

* * * * *